United States Patent [19]

Miyanohara et al.

[11] 4,247,527
[45] Jan. 27, 1981

[54] PROCESS OF PRODUCING ZEOLITE

[75] Inventors: Isao Miyanohara, Kudamatsu; Hiroshi Miyazaki; Shinichi Hashimoto, both of Shin Nanyo, all of Japan

[73] Assignee: Toyo Soda Manufacturing Co., Ltd., Shin Nanyo, Japan

[21] Appl. No.: 49,408

[22] Filed: Jun. 18, 1979

[30] Foreign Application Priority Data

Jun. 19, 1978 [JP] Japan ................................ 53/73277

[51] Int. Cl.³ .............................................. C01B 33/28
[52] U.S. Cl. ..................................... 423/329; 423/118
[58] Field of Search .............................. 423/328–330, 423/118; 252/455 Z

[56] References Cited

U.S. PATENT DOCUMENTS

| 3,425,800 | 2/1969 | Hirsh | 423/329 |
| 4,041,135 | 8/1977 | Williams et al. | 423/328 |
| 4,075,280 | 2/1978 | Fitton et al. | 423/118 |

Primary Examiner—Edward J. Meros
Attorney, Agent, or Firm—Cushman, Darby & Cushman

[57] ABSTRACT

Zeolite substantially free from a free alkali ingredient is produced by a process wherein a silica source and an alumina source is reacted in an aqueous reaction medium containing an excessive amount of an alkali ingredient to form zeolite, followed by separating the so formed zeolite from the aqueous alkaline reaction medium or from an aqueous medium in which the zeolite, after being separated from the aqueous alkaline reaction medium, has been slurried. The separation of the zeolite from the aqueous alkaline reaction medium or from the aqueous medium, in which the zeolite has been slurried after being separated from the aqueous alkaline reaction medium, is effected in the added presence of an alkali metal or alkaline earth metal salt of aluminic acid.

4 Claims, No Drawings

PROCESS OF PRODUCING ZEOLITE

BACKGROUND OF THE INVENTION

1. Field of the Invention

This invention relates to a process of producing zeolite substantially free from a free alkali ingredient. More particularly, it relates to an improvement in a process wherein a silica source and an alumina source is reacted in an aqueous reaction medium containing an excessive amount of an alkali ingredient to form zeolite, followed by separating the so formed zeolite from the aqueous alkaline reaction medium or from an aqueous medium in which the zeolite, after being separated from the aqueous alkaline reaction medium, has been slurried.

Zeolite is an alkali metal or alkaline earth metal salt hydrate of an alumino silicic acid and is of various crystal forms. Generally, zeolite is used in the form of a dried finely divided powder or a pellet prepared from the powder. Zeolite possesses numerous micropores in which crystal water is retained. The crystal water is readily desorbed therefrom without destruction of the crystal lattice when zeolite is heated to an elevated temperature or placed under a reduced pressure. When the water-desorbed zeolite is exposed to moisture of a high humidity, it adsorbs water and reverts to the original state containing crystal water. Similar desorption-adsorption phenomena are also observed with respect to molecules other than water, provided that the molecules are of a size suitable for being entrapped by the micropores of zeolite. In addition, zeolite exhibits a catalyst activity for a particular reaction, for example, isomerization of xylene. Furthermore, zeolite possesses an ion exchange capability. In view of the above-mentioned properties, zeolite has various industrial applications, such as a drying agent, catalyst, catalyst support, adsorbent and ion exchanger.

2. Description of the Prior Art

In a typical wet type method of producing zeolite, a silica ($SiO_2$) source and an alumina ($Al_2O_3$) source are reacted with each other in an aqueous reaction medium containing an excessive amount of an alkali ingredient. The zeolite, so formed, is fine crystalline particles dispersed in the aqueous alkaline reaction medium and in the form of a slurry. The crystalline zeolite particles are separated from the aqueous alkaline reaction medium, and then, the separated zeolite is usually washed with water or neutralized to remove the alkali ingredient retained in the separated zeolite. Thereafter, the zeolite is dried and then optionally calcined, to obtain a final zeolite product in the form of a finely divided powder or a pellet. The separation of fine zeolite particles from the aqueous alkaline reaction medium or from the aqueous washing medium or netrualized medium is effected usually by means of centrifugation or filtration.

Such separation of fine zeolite particles in the conventional method of producing zeolite has some disadvantages. That is, first, since the zeolite particles are very fine, it is cumbersome and requires a substantial period of time to complete the separation. Secondly, the zeolite cake obtained by centrifugation or filtration of the aqueous zeolite slurry usually contains a salient amount, i.e, 30 to 70% by weight, of water, and when the cake is subject to an external force, it collapses and becomes highly viscous and oily. Thus, it is very cumbersome to completely recover the fluidized cake from the centrifugation or filtration apparatus. Furthermore, when the fluidized cake is dried, it is liable to undesirably adhere to the wall of a drying apparatus.

SUMMARY OF THE INVENTION

It is a main object of the present invention to provide a method of producing zeolite substantially free from a free alkali ingredient, wherein the fine zeolite particles are capable of being separated from the aqueous slurry within a reasonably short period of time and without any trouble.

Other objects and advantages of the present invention will be apparent from the following description.

In accordance with the present invention there is provided an improvement in a process of producing zeolite substantially free from a free alkali ingredient wherein a silica source and an alumina source is reacted in an aqueous reaction medium containing an excessive amount of an alkali ingredient to form zeolite, followed by separating the so formed zeolite from the aqueous alkaline reaction medium or from an aqueous medium in which the zeolite, after being separated from the aqueous alkaline reaction medium, has been slurried. The improvement resides in the fact that the separation of the zeolite from the aqueous alkaline reaction medium or from the aqueous medium, in which the zeolite has been slurried after being separated from the aqueous alkaline reaction medium, is effected in the added presence of an alkali metal or alkaline earth metal salt of aluminic acid.

DESCRIPTION OF THE PREFERRED EMBODIMENTS

By the term "alkali" or "alkali ingredient", used in this specification, is meant a hydroxide of an alkali or alkaline earth metal. The typical example thereof is sodium hydroxide.

By the term "free alkali" or "free alkali ingredient", used herein, is meant the alkali other than that which is chemically bonded in a zeolite molecule. For example, the $Na_2O$ of a Na-A type zeolite, which is generally expressed by the formula $Na_2O.Al_2O_3.2SiO_2.nH_2O$, is not a free alkali but a bonded alkali. The formation of zeolite from a silica source and an alumina source is effected in an aqueous reaction medium which contains an excessive amount of an alkali ingredient. That is, the amount of an alkali ingredient present in the aqueous reaction medium is larger than the stoichiometric amount thereof. Thus, upon the completion of reaction, the aqueous reaction medium still contains alkali in a free state, which is referred to as free alkali.

Both silica and alumina sources used in the process of the invention may be conventional. Such sources include, for example, sodium aluminate, sodium silicate, kaolin, cullets, silica sand and aluminium hydroxide. The formation of a zeolite crystal from these silica and alumina sources may be carried out by a known procedure wherein the silica and alumina sources are reacted in an aqueous alkaline medium to form a zeolite gel and, subsequently, the gel-containing medium is heated to crystallize the zeolite.

The fine zeolite crystal particles, so formed, are separated from the aqueous alkaline reaction medium by a conventional separating procedure such as centrifugation or filtration. The aqueous alkaline medium from which the zeolite particles have been separated may be reused as the alkali source for the synthesis of zeolite. The separated zeolite crystal still contains a minor amount of a free alkali ingredient and, therefore, is usually subjected to washing with water and/or neutralization with an acid to remove the free alkali ingredient therefrom. If desired, the step of washing with water may be repeated for the complete removal of the free alkali ingredient.

The main point of the present invention resides in the fact that the separation of the zeolite crystal from the aqueous alkaline reaction medium, or from the aqueous medium, in which the zeolite crystal has been slurried for the washing or the neutralization, is effected in the added presence of an alkali metal or alkaline earth metal salt of an aluminic acid. That is, the separation is effected after incorporating an alkali metal or alkaline earth metal aluminate in the aqueous alkaline reaction medium or the aqueous washing or neutralization medium. By the incorporation of the alkali metal or alkaline earth metal aluminate in the aqueous alkaline reaction medium or the aqueous washing or neutralization medium, the zeolite crystal can be readily filtered off or centrifuged from the aqueous slurry within a reasonably short period of time. Furthermore, the filter cake does not become highly viscous and oily, and thus, the zeolite crystal can be readily and completely recovered from the aqueous slurry.

The alkali metal or alkaline earth metal aluminate used includes, for example, sodium aluminate and barium aluminate. Of these, sodium aluminate is preferable. The amount of the alkali metal or alkaline earth metal aluminate may be generally in the range of 0.01 to 5% by weight, more preferably 0.05 to 2% by weight, expressed in terms of the weight of $Al_2O_3$ contained in the alkali metal or alkaline earth metal aluminate and based on the weight of the zeolite produced.

The manner whereby the alkali metal or alkaline earth metal aluminate is incorporated in the aqueous zeolite slurry is not critical. For example, in the case where the washing with water and/or the neutralization is carried out in a batchwise manner, it is convenient to put the aluminate into the aqueous zeolite slurry while the slurry is being stirred.

When the zeolite crystal separated from the aqueous alkaline reaction medium is repeatedly washed with water, the pH of the aqueous slurry of the zeolite crystal decreases, and finally, reaches a value between 10.5 and 11.0 at the time the free alkali ingredient is substantially completely removed from the zeolite crystal. It should be noted that, as the pH of the aqueous zeolite slurry decreases, the separability of the zeolite crystal from the aqueous slurry is rapidly reduced. Thus, it may be said that the effect brought about by the incorporation of the alkali metal or alkaline earth metal aluminate is much greater when the pH of the aqueous zeolite slurry is low, e.g. in the range of from 10.5 to 11.0.

Furthermore, it has been found that, when the zeolite crystal separated from the aqueous alkaline reaction medium is first washed with water to such an extent that the pH of an aqueous slurry of the zeolite crystal does not become lower than 12.0, and then, the aqueous slurry of zeolite crystal is neutralized with an acid to such an extent that the pH of the aqueous slurry is reduced to 11 or lower, the separability of the zeolite crystal from the resultant aqueous slurry is better than that of the zeolite crystal from the aqueous slurry having the same pH value prepared by repeatedly washing only with water.

As will be apparent from the above explanation regarding to the dependency of the effect of the incorporation of the alkali metal or alkaline earth metal aluminate upon the pH of the aqueous zeolite slurry, the alkali metal or alkaline earth metal aluminate may conveniently be incorporated into the aqueous alkaline reaction medium containing the zeolite produced, provided that the aqueous alkaline reaction medium exhibits a relatively low pH, i.e., lower than 13.5. However, it is desirable that the alkali metal or alkaline earth metal aluminate be incorporated into the aqueous zeolite slurry in the step of washing or neutralization, rather than into the aqueous alkaline reaction medium. It is most preferable that the aluminate be incorporated into the aqueous zeolite slurry at the step of neutralization, particularly before an acid is added to the aqueous zeolite slurry for neutralization. It should be noted, however, that while the effect of the incorporation of the aluminate increases with a decrease in the pH of the aqueous zeolite slurry, an acid should be added in an amount such that the pH of the resulting aqueous zeolite slurry is not lower than approximately 8.0. This is because the crystal structure of zeolite tends to collapse at a pH of lower than approximately 8.0.

An acid may be added directly to the zeolite, separated from the aqueous alkaline reaction medium, for netralization. However, this procedure is not preferable. This is because the zeolite as separated from the aqueous alkaline reaction medium still contains a salient amount of a free alkali ingredient, and accordingly, when such zeolite is directly neutralized, the salt formed by the neutralization of the free alkali ingredient is liable to remain in the final zeolite product leading to a reduction of its quality.

A most preferable procedure for obtaining a zeolite crystal substantially free from a free alkali ingredient is as follows. First, the zeolite crystal is separated from the aqueous alkaline reaction medium to obtain a filter cake. The zeolite filter cake is slurried with a large amount of water, whereby the zeolite crystal is washed with water, and then, the zeolite crystal is filtered off from the aqueous slurry. If desired, this washing with water is repeated. The washing with water should preferably be carried out to an extent such that the resulting aqueous zeolite slurry still exhibits a pH of at least 12, more preferably at least 13. Then, an acid and the alkali metal or alkaline earth metal aluminate are incorporated into the aqueous zeolite slurry having a pH of at least 12, thereby to adjust the pH to a value between approximately 8 and approximately 11, and finally, the zeolite crystal is filtered off from the neutralized slurry.

The neutralization of the aqueous zeolite slurry may be effected by adding thereto an acid popularly used for general neutralization purposes. The acid includes, for example, a mineral acid such as sulfuric acid, hydrochloric acid or nitric acid, a weak acid such as carbonic acid and an organic acid such as acetic acid. An acid equivalet, such as carbon dioxide gas, can also be used. Of these carbon dioxide gas and carbonic acid and other weak acids are preferable.

The process of the present invention can be advantageously applied particularly to A-type and X-type zeolites which are expressed, for example, by the chemical formulae, $Na_2O.Al_2O_3.2SiO_2.4.5H_2O$ and $Na_2O.Al_2O_3.2.5SiO_2.6H_2O$, respectively.

The invention will be further illustrated by the following examples, wherein percents are by weight unless otherwise specified.

EXAMPLE 1

A 25 liter volume reactor was charged with 9.1 kg of an aqueous sodium aluminate solution preheated to a temperature of 50° C. and containing 11.2% of $Al_2O_3$ and 11.9% of $Na_2O$. 9.2 kg of an aqueous sodium silicate solution preheated to a temperature of 50° C. and containing 13.0% of $SiO_2$ and 4.0% and $Na_2O$ were added to the aqueous sodium aluminate solution over a period of 10 minutes while being vigorously stirred. After the completion of addition, the mixture was maintained at a temperature of 50° C. for one hour and, then, raised up to a temperature of 80° C. over a period of 40 minutes, and maintained at that temperature for a period of 10 hours, thereby to complete the crystallization of zeolite.

The zeolite slurry, so obtained, was filtered by using a Buchner's filtering flask to obtain a zeolite cake. The zeolite cake still contained a salient amount of sodium hydroxide. The zeolite cake was placed in 11 liters of water, which was stirred to wash the zeolite cake. The aqueous slurry was filtered. The resultant cake was slurried in 11 liters of water. The aqueous slurry, so obtained, contained a very minor amount of sodium hydroxide and exhibited a pH of 12.9. A 200 milliliter volume beaker was charged with 150 g of the aqueous zeolite slurry, followed by the addition of 0.7 g of an aqueous sodium aluminate solution containing 18.4% of $Al_2O_3$. Carbon dioxide gas was blown into the aqueous sodium aluminate-added zeolite slurry for 5 minutes, while the slurry was stirred. The ph of the resultant zeolite slurry was 10.5 and it substantially contained no sodium hydroxide. The entire amount of the zeolite slurry was filtered under suction, at a reduced pressure of 400 mmHg, by using a leaf-tester provided with a glass filter (11G4). During this filtration operation, the zeolite did not become viscous and oily. The time period spanning from the commencement of filtration to the completion thereof is shown in Table I, below. The wet cake, so obtained, was dried at a temperature of 105° C. for a period of 10 hours. The dried product was proved to be A-type zeolite represented by the formula $Na_2O.Al_2O_3.2SiO_2.3.5H_2O$, by X-ray diffractometry and by reduction in weight on drying at a temperature of 800° C. for one hour.

COMPARATIVE EXAMPLE 1

Following a procedure similar to that employed in Example 1, zeolite was produced, wherein carbon dioxide gas was blown into the aqueous zeolite slurry to which no aqueous sodium aluminate solution had been added, with all other conditions remaining substantially the same. The time period required for the completion of the final filtration is shown in Table I, below. The zeolite cake, obtained by the final filtration, became highly viscous and oily, and thus, was difficult to completely recover from the filtration apparatus.

EXAMPLE 2

Following a procedure similar to that employed in Example 1, zeolite was produced wherein carbon dioxide gas was blown into the aqueous zeolite slurry for 6 minutes, instead of 5 minutes, thereby to change the pH of the slurry to 9.5, with all other conditions remaining substantially the same. The time period required for the completion of the final filtration is shown in Table I, below. During the final filtration of the zeolite slurry, the resulting zeolite cake did not become viscous and oily.

EXAMPLE 3

Following a procedure similar to that employed in Example 1, zeolite was produced wherein carbon dioxide gas was blown into the aqueous zeolite slurry for 8 minutes, instead of 5 minutes, thereby to change the pH of the slurry to 8.5, with all other conditions remaining substantially the same. The time period required for the completion of the final filtration is shown in Table I, below. During the final filtration of the zeolite slurry, the resulting zeolite cake did not become viscous and oily.

EXAMPLE 4

Following a procedure similar to that employed in Example 1, zeolite was produced, wherein 1.5 g, instead of 0.7 g, of the aqueous sodium aluminate solution containing 18.4% of $Al_2O_3$ were added to the aqueous zeolite slurry, with all other conditions remaining substantially the same. The time period required for the completion of the final filtration is shown in Table I, below. During the final filtration of the zeolite slurry, the resulting zeolite cake did not become viscous and oily.

EXAMPLE 5

Following a procedure similar to that employed in Example 3, zeolite was produced, wherein 0.15 g, instead of 0.7 g, of the aqueous sodium aluminate solution containing 18.4% of $Al_2O_3$ were added to the aqueous zeolite slurry, with all other conditions remaining substantially the same. The time period required for the completion of the final filtration is shown in Table I, below. During the final filtration of the zeolite slurry, the resulting zeolite cake did not become viscous and oily.

EXAMPLE 6

Following a procedure similar to that employed in Example 1, zeolite was produced, wherein the amount of the aqueous sodium silicate solution was 14 kg, instead of 9.2 kg, with all other conditions remaining substantially the same. The time period required for the completion of the final filtration is shown in Table I, below. The zeolite cake, obtained by the final filtration, did not become viscous and oily. The product was proved to be X-type zeolite of the formula $Na_2O.Al_2O_3.2.5SiO_2.4H_2O$, by X-ray diffractometry and by reduction in weight on drying at a temperature of 800° C. for one hour.

COMPARATIVE EXAMPLE 2

Following a procedure similar to that employed in Example 6, zeolite was produced, wherein carbon dioxide gas was blown into the aqueous zeolite slurry to which no aqueous sodium aluminate solution had been added, with all other conditions remaining substantially the same. The time period required for the completion of the final filtration is shown in Table I, below. The zeolite cake, obtained by the final filtration, became highly viscous and oily, and thus, was difficult to completely recover from the filtration apparatus.

TABLE I

|  | Time period require for filtration (minutes) | $Al_2O_3$/zeolite* (wt. %) |
|---|---|---|
| Example 1 | 12 | 0.5 |
| Com. Example 1 | 32 | 0 |

TABLE I-continued

|  | Time period require for filtration (minutes) | Al₂O₃/zeolite* (wt. %) |
|---|---|---|
| Example 2 | 5 | 0.5 |
| Example 3 | 3 | 0.5 |
| Example 4 | 6 | 1.0 |
| Example 5 | 5 | 0.1 |
| Example 6 | 14 | 0.4 |
| Com. Example 2 | 39 | 0 |

*Amount of sodium aluminate added to the aqueous zeolite slurry, which amount is expressed in terms of the weight % of $Al_2O_3$ in the sodium aluminate, based on the weight of the zeolite produced.

EXAMPLE 7

A 25 liter volume reactor was charged with 10.5 kg of an aqueous sodium aluminate solution preheated to a temperature of 50° C. and containing 9.7% of $Al_2O_3$ and 11.4% of $Na_2O$. 9.6 kg of an aqueous sodium silicate solution, preheated to a temperature of 50° C., and containing 12.5 of $SiO_2$ and 4.0% of $Na_2O$, were added to the aqueous sodium aluminate solution over a period of 10 minutes while being vigorously stirred. After the completion of the addition, the mixture was maintained at a temperature of 50° C. for one hour and, then, raised to a temperature of 80° C. over a period of 40 minutes, and maintained at that temperature for a period of 10 hours, thereby to complete the crystallization of zeolite.

The zeolite slurry, so obtained, was filtered by using a Buchner's filtering flask to obtain a zeolite cake. The zeolite cake still contained a salient amount of sodium hydroxide. The zeolite cake was placed in 29 liters of water, which was stirred to wash the zeolite cake. The aqueous slurry was filtered. The resultant cake was slurried in 29 liters of water. The aqueous slurry, so obtained, exhibited a pH of 13.1. A 200 milliliter volume beaker was charged with 200 g of the aqueous zeolite slurry and, then, carbon dioxide gas was blown into the aqueous zeolite slurry for 5 minutes, while the slurry was stirred. The pH of the resultant zeolite slurry was 10.0. An aqueous sodium aluminate solution containing 18.4% of $Al_2O_3$ was added to the aqueous zeolite slurry. The amount of the aqueous sodium aluminate solution added was such that the proportion of the weight of $Al_2O_3$ in the sodium aluminate to the weight of the zeolite produced was equal to the corresponding proportion employed in Example 1. The entire amount of the zeolite slurry was filtered under suction, at a reduced pressure of 400 mmHg, by using a leaf-tester provided with a glass filter (11G4). The time period required for the completion of filtration is shown in Table II, below. The wet cake, so obtained, was dried at a temperature of 110° C. for a period of 10 hours. The dried product was proved to be A-type zeolite by X-ray diffractometry.

EXAMPLE 8

Following a procedure similar to that employed in Example 7, zeolite was produced, wherein the amount of the aqueous sodium aluminate solution added to the aqueous zeolite slurry was changes so that the proportion of the weight of $Al_2O_3$ in the sodium aluminate to the weight of the zeolite produced was equal to the corresponding proportion employed in Example 4. All other conditions remained substantially the same. The time period required for the completion of the final filtration is shown in Table II, below.

EXAMPLE 9

Following a procedure similar to that employed in Example 7, zeolite was produced, wherein carbon dioxide gas was blown into the aqueous zeolite slurry for 6 minutes, instead of 5 minutes, thereby to change the pH of the slurry to 9.0, with all other conditions remaining substantially the same. The time period required for the completion of the final filtration is shown in Table II, below.

EXAMPLE 10

Following a procedure similar to that employed in Example 7, zeolite was produced, wherein carbon dioxide gas was blown into the aqueous zeolite slurry for 8 minutes, instead of 5 minutes, thereby to change the pH of the slurry to 8.0, with all other conditions remaining substantially the same. The time period required for the completion of the final filtration is shown in Table II, below.

COMPARATIVE EXAMPLE 3

200 g of the aqueous zeolite slurry having a pH of 13.1, prepared in Example 7, were filtered and, then, the resulting cake was slurried in 160 ml of water to wash the cake. An aqueous sodium aluminate solution was added to the aqueous zeolite slurry and, then, filtered. The amount of the aqueous sodium aluminate added was such that the proportion of the weight of $Al_2O_3$ in the sodium aluminate to the weight of the zeolite produced was equal to the corresponding proportion employed in Example 1. The above-mentioned washing with water, addition of an aqueous sodium aluminate solution and filtration were further repeated twice. The pH of the aqueous zeolite slurry at the first, second and third washing stages was 12.8, 11.3 and 10.9, respectively. The time periods required for the completion of the respective filtrations are shown in Table II, below.

TABLE II

|  | Time period required for filtration (minutes) | pH of zeolite slurry | Al₂O₃/zeolite* (wt. %) |
|---|---|---|---|
| Example 7 | 11 | 10 | 0.5 |
| Example 8 | 8 | 10 | 1.0 |
| Example 9 | 6 | 9 | 0.5 |
| Example 10 | 5 | 8 | 0.5 |
| Comparative Example 3 |  |  |  |
| (first) | 14 | 12.8 | 0.5 |
| (second) | 14 | 11.3 | 0.5 |
| (third) | 15 | 10.9 | 0.5 |

*Amount of sodium aluminate added to the aqueous zeolite slurry, which amount is expressed in terms of the weight % of $Al_2O_3$ in the sodium aluminate, based on the weight of the zeolite produced.

What we claim is:

1. In a process of producing zeolite substantially free from a free alkali ingredient wherein a silica source and an alumina source are reacted in an aqueous reaction medium containing an excessive amount of an alkali ingredient to form zeolite; the so formed zeolite is separated from the aqueous alkaline reaction medium; and then, the separated zeolite is washed at least one time with an aqueous medium which is either free from or contains an alkali metal or alkaline earth metal salt of aluminic acid; the improvement comprising:

washing the separated zeolite at least one time with an aqueous medium by incorporating the zeolite in the aqueous medium to prepare an aqueous zeolite slurry;

incorporating in the aqueous zeolite slurry an alkali metal or alkaline earth metal salt of aluminic acid and an acid, the amount of the acid being sufficient to reduce the pH of the aqueous zeolite slurry to a value between approximately 8 and approximately 11; and separating the zeolite from the so neutralized aqueous medium.

2. A process according to claim 1 wherein the amount of the alkali metal or alkaline earth metal salt of aluminic acid to be incorporated in the zeolite slurry is in the range of from 0.01 to 5% by weight expressed in terms of the weight of $Al_2O_3$ contained in the alkali metal or alkaline earth metal aluminate and based on the weight of the zeolite produced.

3. A process according to claim 1 or 2 wherein the alkali ingredient is sodium hydroxide and the aluminic acid salt is sodium aluminate.

4. A process according to claim 1 or 2 wherein the aqueous zeolite slurry to be neutralized has a pH of at least 12.

* * * * *